(12) United States Patent
Bala et al.

(10) Patent No.: US 7,586,040 B1
(45) Date of Patent: Sep. 8, 2009

(54) MULTIPLE COMPONENT WALL PLATE

(75) Inventors: Kapil Rao Ganta Papa Rao Bala, Syracuse, NY (US); Theodore P. Junko, Manlius, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 468 days.

(21) Appl. No.: 11/247,896

(22) Filed: Oct. 11, 2005

(51) Int. Cl.
 *H02G 3/14* (2006.01)
(52) U.S. Cl. .......................... 174/66; 174/67; 220/241; 220/242; 439/536; D13/156
(58) Field of Classification Search .................. 174/66, 174/67, 50, 53, 57, 58; 220/3.2–3.9, 241, 220/242, 4.02; 248/906; 439/535, 536, 491; D8/353; D39/156, 177; 40/611.01, 649
 See application file for complete search history.

(56) References Cited

U.S. PATENT DOCUMENTS

| 2,740,873 | A | | 4/1956 | Cronk |
| 2,984,725 | A | | 5/1961 | Hubbell et al. |
| 3,197,549 | A | | 7/1965 | Good |
| 3,908,235 | A | | 9/1975 | Telliard et al. |
| 3,953,933 | A | | 5/1976 | Goldstein |
| 3,987,928 | A | | 10/1976 | Mori |
| 4,631,354 | A | | 12/1986 | Boteler |
| 4,733,330 | A | | 3/1988 | Tanaka et al. |
| 4,780,573 | A | | 10/1988 | Own |
| 4,800,239 | A | | 1/1989 | Hill |
| 4,835,343 | A | | 5/1989 | Graef et al. |
| 5,041,698 | A | | 8/1991 | Takagi et al. |
| 5,189,259 | A | | 2/1993 | Carson et al. |
| 5,594,206 | A | * | 1/1997 | Klas et al. .................... 174/66 |
| 5,613,874 | A | * | 3/1997 | Orlando et al. ............. 439/491 |
| 5,675,125 | A | | 10/1997 | Hollinger |
| 5,770,817 | A | * | 6/1998 | Lo .............................. 174/57 |
| 5,862,616 | A | * | 1/1999 | Peroni ..................... 40/611.01 |
| 5,961,345 | A | * | 10/1999 | Finn et al. .................... 439/536 |
| D429,623 | S | * | 8/2000 | De brey et al. .............. D8/353 |
| 6,102,360 | A | * | 8/2000 | Clegg et al. .................. 248/906 |
| 6,172,301 | B1 | * | 1/2001 | Goodsell ...................... 174/66 |
| 6,421,941 | B1 | * | 7/2002 | Finke et al. ................... 174/66 |
| 6,422,898 | B1 | * | 7/2002 | Harvey et al. ............... 439/536 |
| 6,566,602 | B1 | * | 5/2003 | Miller et al. .................. 174/66 |
| 6,593,530 | B2 | * | 7/2003 | Hunt ............................ 174/66 |

(Continued)

*Primary Examiner*—Angel R Estrada
(74) *Attorney, Agent, or Firm*—Daniel P. Malley; Bond, Schoeneck & King, PLLC

(57) ABSTRACT

The present invention is directed to a decorative wall plate assembly configured to cover at least one electrical device disposed in a wall box. The assembly includes a base plate member comprising a center portion including at least one aperture configured to accommodate the at least one electrical device, a first end portion of the base plate member including at least one first plate connection device, and a second end portion of the base plate member including at least one second plate connection device. The center portion is disposed between the first end portion and the second end portion. A first cover cap includes at least one first cover cap connection device configured to mate with the at least one first plate connection device. The first cover cap is configured to cover the first end portion. A second cover cap includes at least one second cover cap connection device configured to mate with the at least one second plate connection device. The second cover cap is configured to cover the second end portion.

47 Claims, 10 Drawing Sheets

U.S. PATENT DOCUMENTS 6,616,005 B1 * 9/2003 Pereira et al. .................. 174/66
6,718,674 B2 * 4/2004 Caveney et al. ............... 40/649
7,007,422 B2 * 3/2006 Caveney et al. ............... 40/649
7,279,637 B1 * 10/2007 O'Young et al. .............. 174/66

* cited by examiner

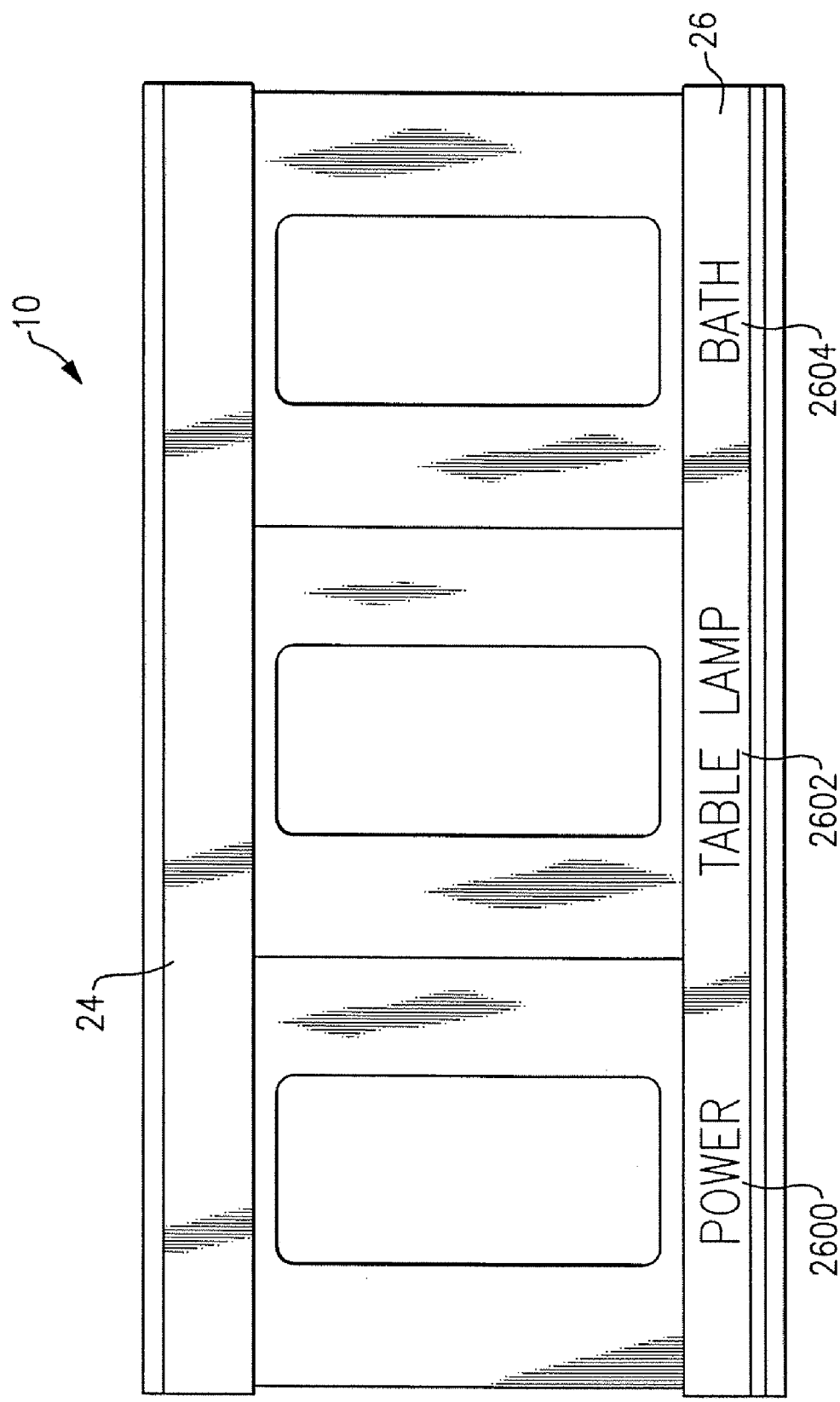

MULTIPLE COMPONENT WALL PLATE

BACKGROUND OF THE INVENTION

1. Field of the Invention

The present invention relates generally to wall plate systems, and particularly to customized wall plates.

2. Technical Background

Electrical wiring devices such as switches, GFCIs, AFCIs, electrical outlets, dimmers, night-lights, TVSSs, surge protective device (SPD), proximity sensing devices and the like are installed in wall boxes attached to a structural member and covered by a wall plate. Structural members include countertop surfaces, panels, walls, floors, ceilings, and the like. Conventional wall plates typically have a rectangular form factor and may be formed from plastic, metal or wood materials. Conventional plates include screw holes, disposed at the top and bottom of the wall plate, as a means for fastening the plate to the wiring device, wall box, or structural member. There are several drawbacks to conventional wall plates. Conventional wall plates are relatively unattractive and generally have little decorative appeal. The attachment screws are visible, which further detracts from any aesthetic qualities that the plate may have.

What is needed, therefore, is a cover plate customized to match the décor, furniture or appliances in a room. A cover plate assembly is needed that is decorative, attractive and in aesthetic harmony with the space wherein it is disposed. A cover plate assembly is needed that includes components that are easily replaceable and/or interchangeable, such that the homeowner may readily purchase new decorative components to match a new décor, without having to replace the entire decorative wall plate assembly.

SUMMARY OF THE INVENTION

The present invention addresses the needs described above. The present invention provides a cover plate customized to match the décor, furniture or appliances in a room. The present invention is advantageously directed to a cover plate assembly that includes components that are easily replaceable and/or interchangeable, allowing the homeowner to purchase new decorative components to match a new décor, without having to replace the entire decorative wall plate assembly. This feature is also advantageous to the manufacturer because it allows the manufacturer to provide a certain "mix-and-matchability" and/or customizability for less capital investment.

One aspect of the present invention is directed to a decorative wall plate assembly configured to cover at least one electrical device disposed in a wall box. The assembly includes a base plate member having a center portion including at least one aperture configured to accommodate the at least one electrical device, a first end portion of the base plate member including at least one first plate connection device, and a second end portion of the base plate member including at least one second plate connection device. The center portion is disposed between the first end portion and the second end portion. A first cover cap includes at least one first cover cap connection device configured to mate with the at least one first plate connection device. The first cover cap is configured to cover the first end portion. A second cover cap includes at least one second cover cap connection device configured to mate with the at least one second plate connection device. The second cover cap is configured to cover the second end portion.

In another aspect, the present invention is directed to a method for making a decorative wall plate assembly configured to cover at least one electrical device disposed in a wall box. The method includes forming a base plate member. The base plate member is formed to include a center portion including at least one aperture configured to accommodate the at least one electrical device, a first end portion of the base plate member including at least one first plate connection device, and a second end portion of the base plate member including at least one second plate connection device. The center portion is disposed between the first end portion and the second end portion. A first cover cap is formed to include at least one first cover cap connection device configured to mate with the at least one first plate connection device. The first cover cap is configured to cover the first end portion. A second cover cap is formed to include at least one second cover cap connection device configured to mate with the at least one second plate connection device. The second cover cap is configured to cover the second end portion.

In another aspect, the present invention is directed to a decorative wall plate assembly configured to cover at least one electrical device disposed in a wall box. The assembly includes a base plate member having a center portion including at least one aperture configured to accommodate the at least one electrical device, a first end portion of the base plate member including at least one first plate connection device, and a second end portion of the base plate member including at least one second plate connection device. The center portion is disposed between the first end portion and the second end portion and includes a center portion finished surface. A first cover cap includes at least one first cover cap connection device configured to mate with the at least one first plate connection device. The first cover cap is configured to cover the first end portion and includes a first cover cap finished surface. A second cover cap includes at least one second cover cap connection device configured to mate with the at least one second plate connection device. The second cover cap is configured to cover the second end portion and includes a second cover cap finished surface.

In yet another aspect, the present invention is directed to a method for redecorating a living space that includes at least one decorative wall plate assembly configured to cover at least one electrical device disposed in a wall box. The decorative wall plate assembly includes a decorative wall plate assembly configured to cover at least one electrical device disposed in a wall box. The assembly includes a base plate member having a center portion including at least one aperture configured to accommodate the at least one electrical device, a first end portion of the base plate member including at least one first plate connection device, and a second end portion of the base plate member including at least one second plate connection device. The center portion is disposed between the first end portion and the second end portion. A first cover cap includes at least one first cover cap connection device configured to mate with the at least one first plate connection device. The first cover cap is configured to cover the first end portion. A second cover cap includes at least one second cover cap connection device configured to mate with the at least one second plate connection device. The second cover cap is configured to cover the second end portion. The method includes: removing the first cover cap from the first end portion; and attaching a substitute first cover cap including at least one first cover cap connection device configured to mate with the at least one first plate connection device, the substitute first cover cap being configured to cover the first end portion.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 11 is a detailed view of a decorative wall plate assembly having human readable indicia disposed on a cover cap;

DETAILED DESCRIPTION

Figure 1:
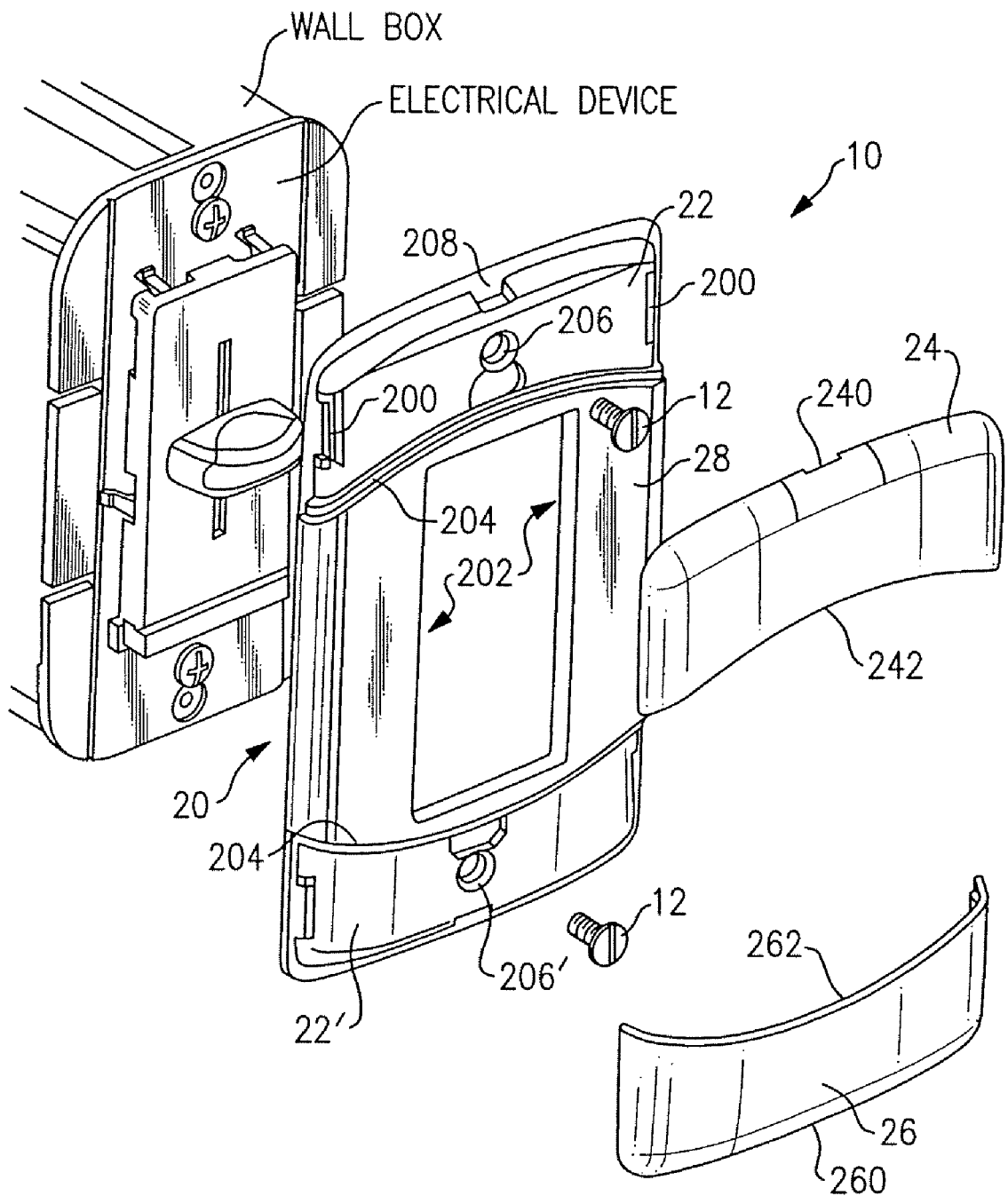
FIG. 1 is an exploded view of a decorative wall plate assembly in accordance with an embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the decorative wall plate assembly of the present invention is shown in FIG. 1, and is designated generally throughout by reference numeral 10.

As embodied herein, and depicted in FIG. 1, an exploded view of a decorative wall plate assembly 10 in accordance with an embodiment of the present invention is disclosed. Assembly 10 includes base plate 20 and cover caps 24, 26.

Base plate 20 is configured to be mounted to the electrical device by fasteners 12. The fasteners 12 are inserted into screw holes 206 and mate with corresponding screw holes formed in the electrical device, wall box, or structural member. Alternatively, fasteners 12 include snaps (not shown) that are rearwardly disposed on base plate 20 that mate with corresponding holes formed in the electrical device, wall box, or structural member.

Base plate 20 includes a center portion 28 that has an aperture 202 formed therein. The size of aperture 202 is configured to accommodate the electrical device. Accordingly, the size and shape of the aperture may vary depending upon the application, i.e., the type of electrical device being installed in the wall box. Base plate 20 also includes end portions (22, 22'). The interfaces 204 between center portion 28 and end portions (22, 22') conform to the shape of cover caps 24, 26. In particular, interfaces 204 are formed to accommodate interior portions 242, 262. The surfaces of end portions (22, 22'), demarcated by interfaces 204, are inwardly stepped with respect to the surface of center portion 28 such that cover caps 24, 26 assemble substantially flush to the center portion. In another embodiment, the surfaces of end portions (22, 22'), demarcated by interfaces 204, are outwardly stepped with respect to the surface of center portion 28 (not shown.) Consequently, the cover caps assemble in elevated relationship with respect to the surface of the center portion.

Each end portion (22, 22') includes a plurality of connection elements 200 disposed on either side of plate 20. Connection devices 200 mate with corresponding connection elements disposed on the under-side of cover caps 24, 26. Accordingly, cover cap 24 is inserted into end portion 22 to thereby cover screw hole 206. Similarly, cover cap 26 is inserted into end portion 22' to cover screw hole 206'. Note also that center portion 28 is raised relative to the surfaces of end portions 22, 24 such that cover caps 24, 26, are flush with center portion 28 when fixedly attached to base plate 20.

Figure 2A:
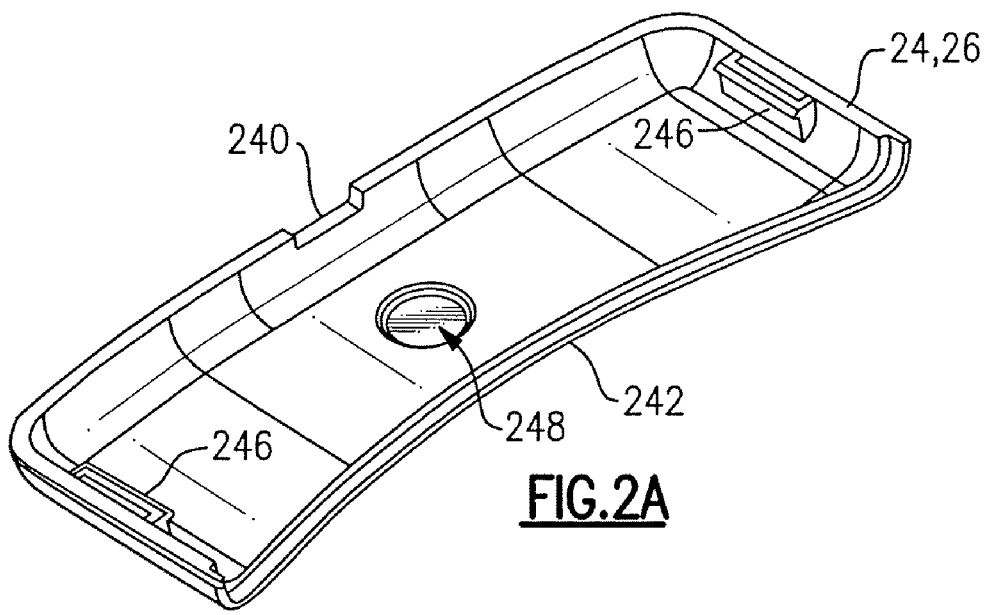
FIG. 2A-2C include various views of the underside of an end cover cap shown in FIG. 1.
Figure 2B:
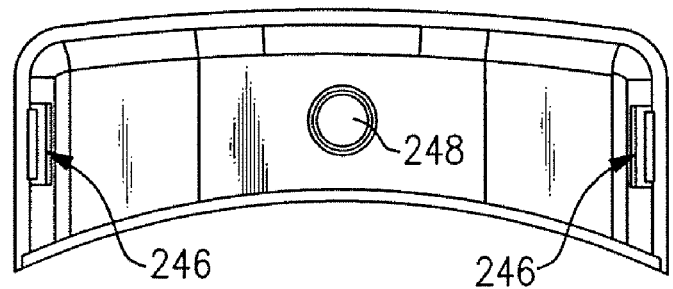
Figure 2C:

FIG. 2A-2C include various views of the underside of the cover caps 24, 26 shown in FIG. 1. As alluded to above, connection elements 200 (shown in FIG. 1) mate with connection elements 246 disposed on the under-side of cover caps 24, 26. Those of ordinary skill in the pertinent art will understand that modifications and variations may be made to connection devices 200, 246. In one embodiment, base plate connection elements 200 are female elements configured to accommodate male cover cap elements 246 when inserted therein. In another embodiment, connection elements 246 are configured to snap into connection elements 200. In yet another embodiment, end-cover caps (24, 26) are configured to slide onto base plate 20. A recess 248 may be disposed in the underside of cover caps 24, 26 to accommodate fasteners 12.

Figure 3:
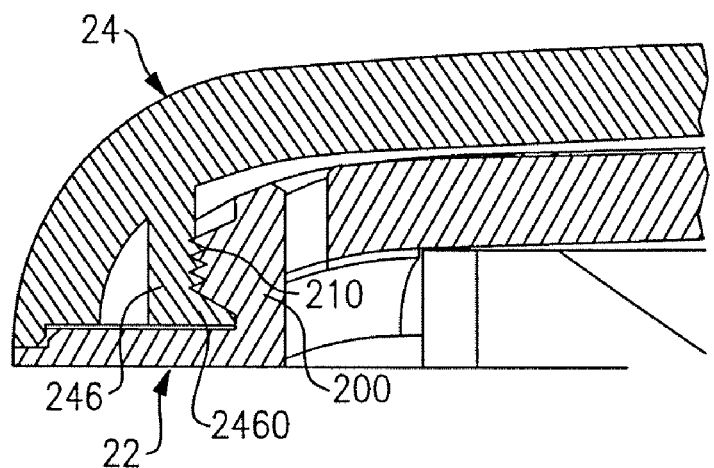
FIG. 3 is a cross-sectional view of a base plate/cover cap connection system in accordance with an embodiment of the present invention.

Referring to FIG. 3, a cross-sectional view of the base plate/cover cap connection apparatus in accordance with another embodiment is disclosed. In this embodiment, cover cap 24 includes a connection element 246 which extends away from cover cap 24. Connection element 246 includes a tooth member 2460 which extends from element 246 at a right angle. Base plate connection element 200 extends from end portion 22 and includes a series of multi-position teeth 210. When cover cap 24 is pressed onto end portion 22, tooth member 2460 is configured to ratchet onto plate connection device 200 by sliding over teeth 210. Teeth 210 are oriented such that tooth member 2460 cannot easily disengage from connection device 200. One utility of the embodiment of FIG. 3 is that it provides a leveling connection means that allows the cover caps to compensate for un-even wall surfaces. Of course, cover caps 24, 26 may be disassembled in the manner described below.

Figure 4A:
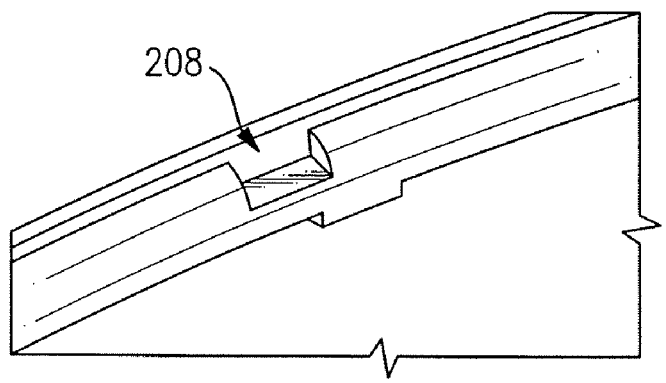
FIGS. 4A and 4B are directed to a cover cap disassembly arrangement in accordance with an embodiment of the present invention.
Figure 4B:
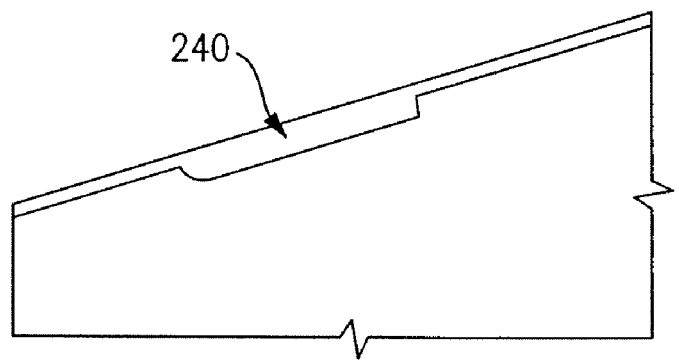

Referring to FIGS. 4A and 4B, a cover cap disassembly arrangement in accordance with an embodiment of the present invention is disclosed. As explained above, base plate 20 mounts over the strap of the electrical device in a manner similar to other wall plate designs. However, the cover caps 24, 26 are inserted and/or snapped onto the base plate 20 by way of the connective elements (200, 246) described above. Disassembly is accomplished by way of tab element 208 disposed on base plate 20 (see also FIG. 1) and slot elements (240, 260) disposed on the cover caps (24, 26). Slot element 240 is configured to accommodate a screw driver or some other tool that may be used to pry off the cover caps (24, 26). Tab element 208 prevents the wall from being damaged by the tool by providing a robust and resilient leveraging surface for the prying tool.

Figure 5:
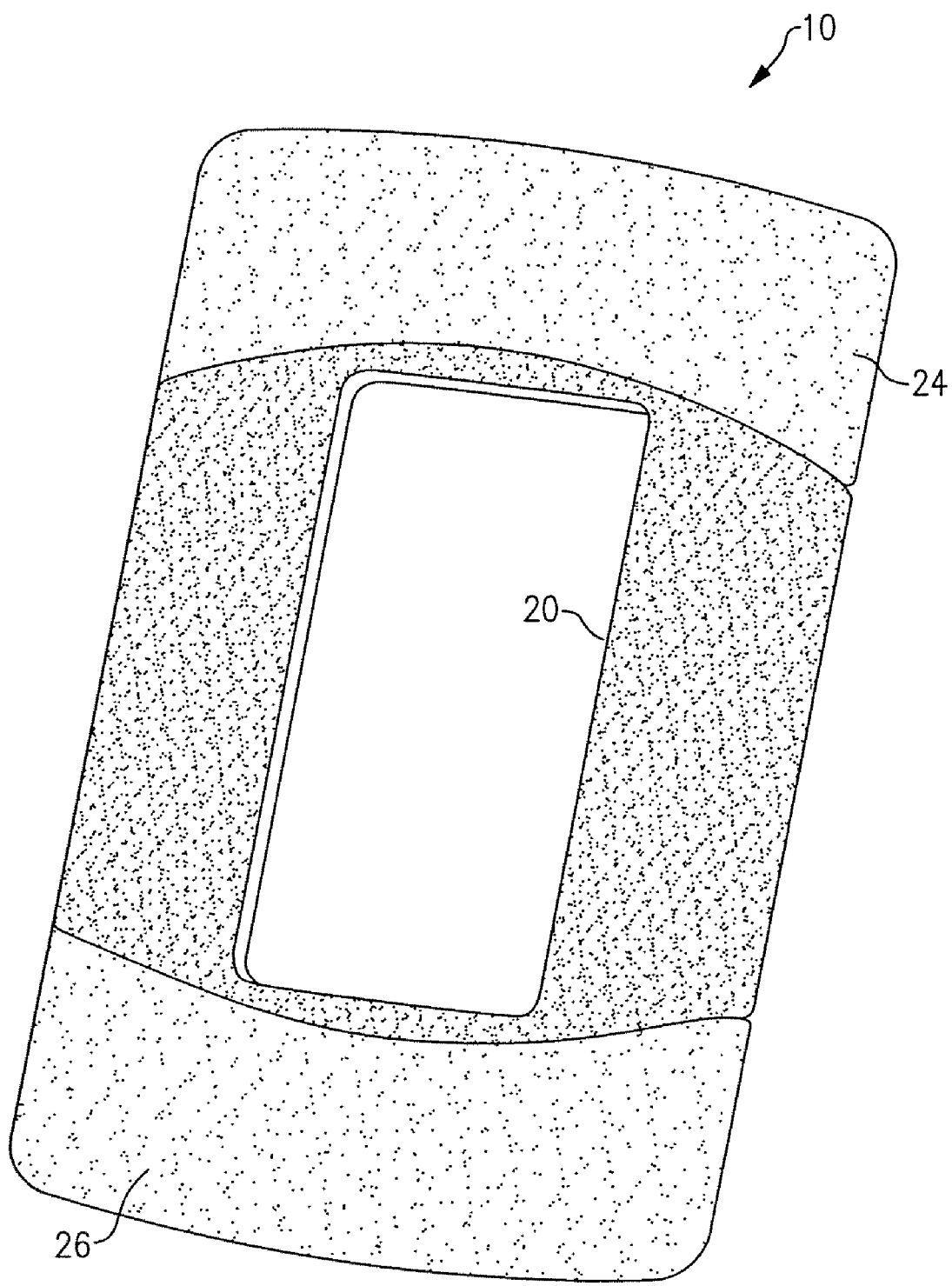
FIG. 5 is a plan view of the decorative wall plate assembly shown in FIG. 1.

Referring to FIG. 5, a plan view of the assembled decorative wall plate assembly 10 shown in FIG. 1 is disclosed. As will be described in more detail below, the end cover caps (24, 26) are decorative pieces that are designed to improve the aesthetics of the wall plate in several different ways. First, the cover caps (24, 26) may be designed to match colors, styles, patterns, or other decorative features of a room. Second, the cover caps (24, 26) also function to hide the screw from view.

As those of ordinary skill in the art will understand, base plate 20 and cover caps (24, 26) may be formed from any suitable material. For example, these components may be manufactured using plastic materials, polycarbonates, nylon materials, and/or metal materials. Accordingly, the base plate 20 and the cover caps (24, 26) may be formed by any suitable process such as injection molding, casting, stamping, and/or milling. The decorative cover caps (24, 26) may include finish layers formed by depositing and/or applying finish materials such as wood veneer, stone, clear plastic, metal, polycarbonate, corian and/or leather materials. All of the components may be formed using various colorants. The component may be of a single colorant or be a color blend. The components may be translucent or opaque. The components may be formed using various types or kinds of in-mold textures. Those of ordinary skill in the art will also understand that component finishes may be applied using any suitable technique, such as: painting; pad printing; silk screening; vacuum metallization; hot stamping; cubic water cast graphics; in-mold decoration techniques; dye-sublimation printing; over-molding techniques; insert molding of a second material; plating; anodizing; and/or bonding of wood, metal, fabric or fiber veneers to a plastic substrate. As alluded to above, the cover caps are easily replaceable and/or interchangeable. The homeowner may replace end caps to match a new décor, without having to replace the base plate. This feature is also advantageous to the manufacturer because it allows the manufacturer to provide a certain "mix-and-matchability" and/or customizability for less capital investment.

In another embodiment, cover caps (24, 26) are comprised of a clear plastic material. Each cover cap is configured to accommodate a sheet of material disposed between the cover cap and the corresponding base plate end portion (22, 22'). The sheet of material may be selected to match a selected décor, a color, pattern, item, and/or furniture style. Of course, the sheet may also include human readable indicia such as alpha-numeric figures or symbols. The human readable indicia may provide useful information regarding the electrical device or some other such data. For example, the information provided may include the device type (GFCI, AFCI, TVSS, etc), the electrical rating data, the function of a switchable setting, the identity of a preferred switchable setting, or the identity of a load being controlled by the electrical device.

In an alternate embodiment, human readable indicia may be provided on either end cover cap (24, 26) or both. The human readable indicia may include at least one symbol or at least one alpha-numeric figure. The human readable indicia may be in the form of raised lettering including Braille, embossed lettering, transfer-printed lettering, and the like. The human readable indicia may provide useful information regarding the electrical device or some other such data. Examples of information about the electrical device are the device type (GFCI, AFCI, TVSS, etc), an electrical rating; an electrical characteristic, the function of a control button, the identity of a preferred control button setting, or the identity of a load being controlled by the electrical device.

In an alternate embodiment, a portion of at least one of end cover caps 24, 26 includes either a transparent or translucent material (not shown.) The portion may be either integral to the end cover cap or a snap-in lens. The electrical device may include a visible light indicator configured to display an operative condition of the electrical device. The base plate may be apertured to permit light emitted by the light indicator to be visible through the end cover cap portion. In addition, the end cover cap portion may include a colorant that serves to generate useful information, such as the color red for indicating that the electrical device is providing power to a load. End cover caps (24, 26) may be selectable from a plurality of end cover caps that have a variety of end cover cap portions. By changing from one cover to another, the light may be given a visibly different color, intensity, texture, or directivity. Of course, the end cover cap may include other features and benefits that have been described above.

In an alternate embodiment, the electrical device may be of a type configured to respond to an ambient light condition. Such devices include night-lights, dimmers, power control systems and proximity sensors. The ambient light may not necessarily be a visible ambient light. A portion of at least one of end cover caps 24, 26 includes either a transparent or translucent material (not shown.) The portion may be either integral to the end cover cap or a snap-in lens. The electrical device includes an ambient light detector. The base plate is apertured to permit light entering the end cover cap portion to reach the ambient light sensor. End cover caps 24, 26 may be selectable from a plurality of end cover caps that have a variety of end cover cap portions. By changing from one end cover cap to another, the ambient light sensor is rendered responsive to an ambient light condition having a particular intensity, frequency spectra, directivity, and the like.

Figure 6A:
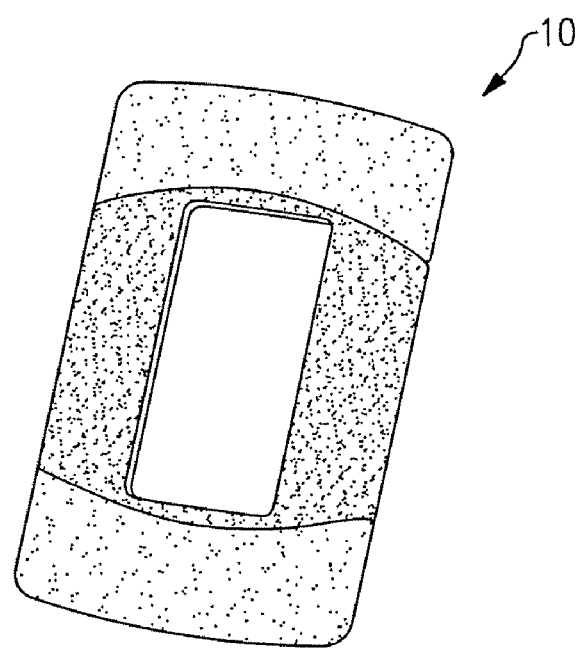
FIGS. 6A and 6B show a decorative wall plate assembly in accordance with a second embodiment of the present invention.
Figure 6B:
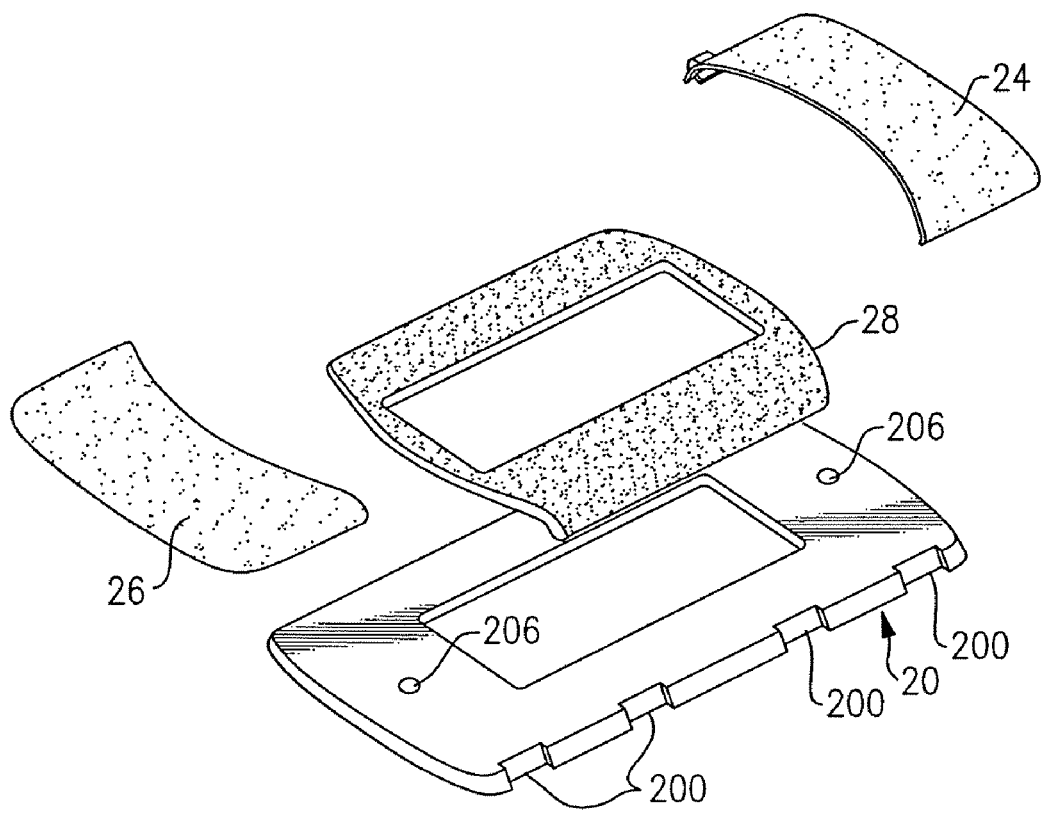

As embodied herein and depicted in FIGS. 6A and 6B, a decorative wall plate assembly 10 in accordance with a second embodiment of the present invention is shown. This embodiment features a four (4) piece design. Base plate 20 and cover caps (24, 26) may, for example, be similar to the components shown in FIG. 1. The base plate 20 shown in FIG. 6B is not shown to include an interface 204. However, interface 204 may be included as an assembly guide. The four piece design includes base plate 20, cover caps (24, 26) and a center cover plate 28. Accordingly, each of the three cover portions (24, 26, 28) may include decorative features. Center cover 28 may be comprised of material such as plastics, polycarbonates, nylons, and/or metal materials. Center cover 28 may also include a finish layer comprised of a finish material such as wood veneer, clear plastic, stone, metal, polycarbonate, corian and/or leather. In another embodiment, center portion 28 may be replaced by a two-piece center portion. The two piece design includes two lateral cover caps (28, 28'). Of course, base plate 20 is designed accordingly to accommodate the various pieces. To assemble, each cover cap (24, 26, 28, 28') is snapped onto base plate 20.

Figure 7:
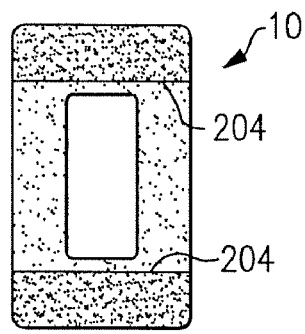
FIG. 7 is an alternate embodiment of the decorative wall plate assembly shown in FIG. 1.

Referring to FIG. 7, an alternate embodiment of the decorative wall plate assembly shown in FIG. 1 is disclosed. The assembly shown in FIG. 1 illustrates a curvilinear interface 204. The embodiment of FIG. 7 illustrates a substantially linear interface 204. It will be apparent to those of ordinary skill in the pertinent art that modifications and variations can be made to interface 204 of the present invention depending on the décor, furniture or appliances in a living space or room. For example, interface 204 may be curvilinear, linear, or conform to any style, shape or pattern. Interface 204 may include rectangular or triangular shaped patterns. Those of ordinary skill in the art will also understand that cover caps 24, 26, and interface 204 may also accommodate different styles and motifs such as Art Deco, Modern, Early American, French Provincial, and Mediterranean, to name a few. Of course, the present invention should not be construed as being limited to the list provided above, these are merely representative examples.

Figure 8:
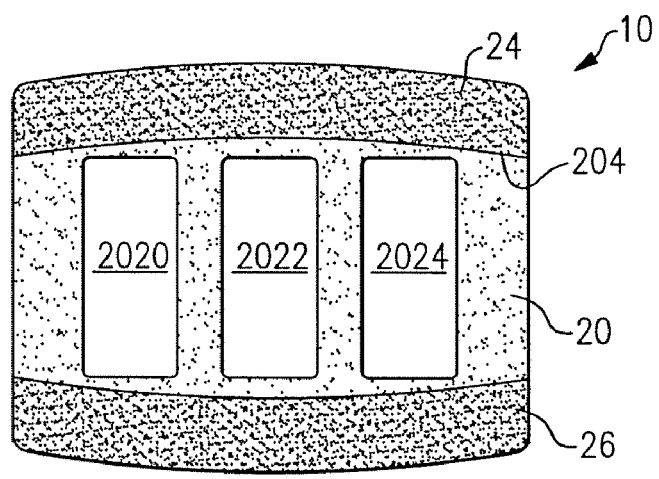
FIG. 8 is a multi-gang decorative wall plate assembly in accordance with yet another embodiment of the present invention.
Figure 9:
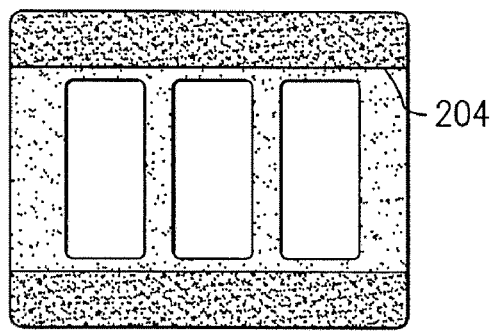
FIG. 9 is an alternate embodiment of the multi-gang decorative wall plate assembly shown in FIG. 8.

As embodied herein and depicted in FIG. 8 and FIG. 9, multi-gang decorative wall plate assemblies in accordance with yet another embodiment of the present invention are disclosed. Both of these embodiments show the present invention as applied to a three gang decorative cover plate assembly. FIG. 8 shows a device 10 having a curvilinear interface design. The device of FIG. 9 has a linear interface 204. As in the single device embodiment, interface 204 may be curvilinear, linear, or conform to any style, shape or pattern.

In both FIG. 8 and FIG. 9, base plate 20 includes three apertures (2020, 2022, 2024) that are configured to accommodate three electrical devices. Of course, the present invention may be employed with any type of electrical device including electrical switches, electrical outlets, dimmer switches, thermostats, sensor devices, cable television devices, telephony related devices, TVSS devices, and/or an electric circuit protection device, such as GFCIs. Those of ordinary skill in the art will understand that the present invention should not be construed as being limited to the aforementioned devices.

Figure 10A:
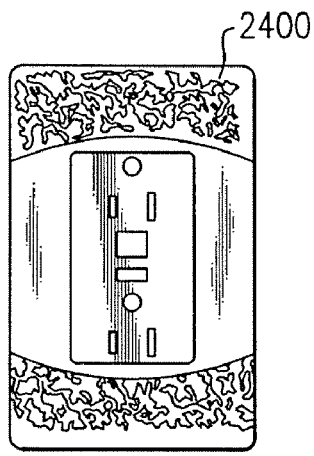
FIG. 10A-10E show alternate cover plate finishes in accordance with the present invention.
Figure 10B:
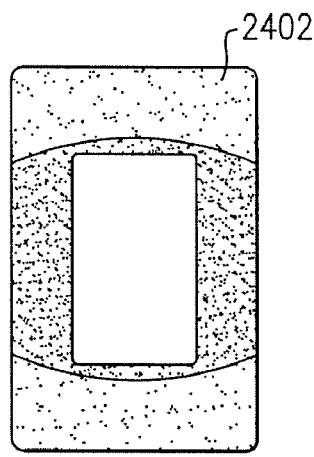
Figure 10C:
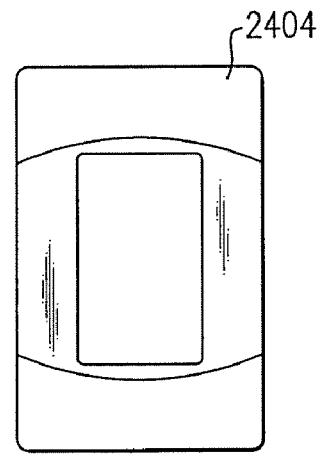
Figure 10D:
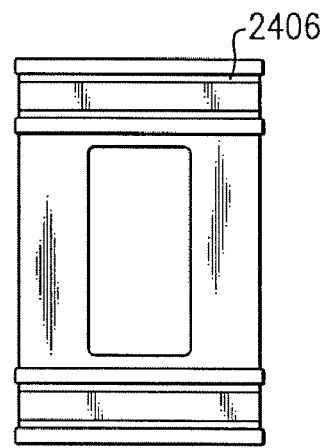
Figure 10E:
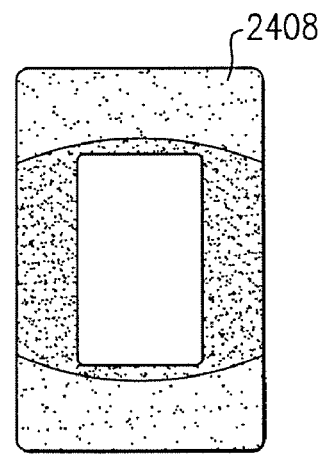

Referring to FIGS. 10A-10E, alternate cover plate finishes in accordance with the present invention are disclosed. In FIG. 10A, the decorative end caps (24, 26) include a Corian or Stone finish. Cover caps may also have a metallic finish (FIG. 10B), a polycarbonate finish (FIG. 10C), or a wood finish (FIG. 10E). The decorative cover caps may be molded to match the room's trim (FIG. 10D). Other finishes such as glass/clear plastic and leather may be employed as well. The metallic finishes may be of any suitable type including aluminum, chrome, bronze, silver, mercury, or gold. Wood finishes may also include oak, mahogany, maple, or be of any suitable type.

FIG. 11 is a detailed view of a decorative wall plate assembly having human readable indicia disposed on a cover cap. While FIG. 11 is depicted as a multi-gang assembly, those of ordinary skill in the art will understand that the inventive concepts also extend to the single gang assemblies depicted herein. In the example of FIG. 11, the bottom cover cap 26 is stamped or molded to include human readable indicia. In this case, each of the switches are labeled to identify the device they are configured to operate, such as the foyer light, the table lamp, or the bath room lights. Of course, those skilled in the art will understand that Braille characters may also be employed as a means for aiding those with visual disabilities.

Those skilled in the art will further understand that the applications for the present invention are only limited by the human imagination.

Figure 12A:
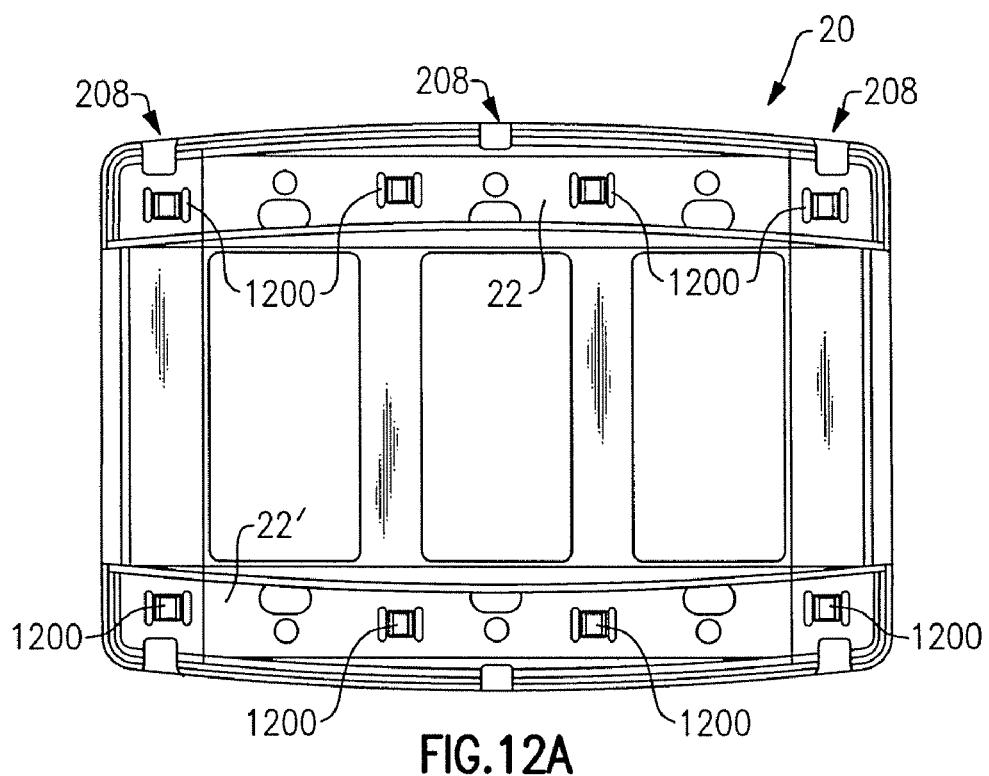
FIGS. 12A-12D show a base plate/cover cap connection system in accordance with another embodiment of the present invention.
Figure 12B:
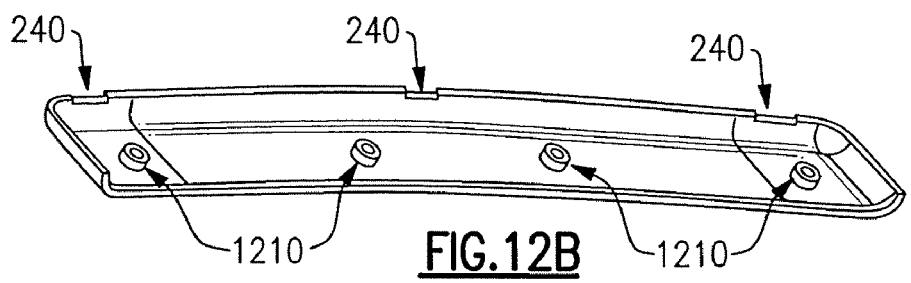
Figure 12C:
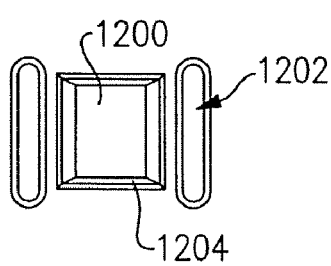
Figure 12D:
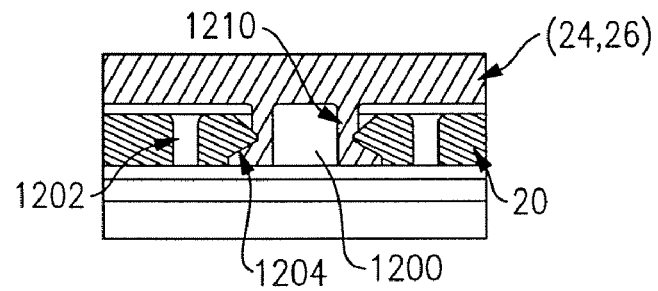

Referring to FIGS. 12A-12D, a base plate/cover cap connection system in accordance with another embodiment of the present invention is disclosed. In this embodiment, base plate member 20 includes notches 1200 disposed in the end portions (22, 22'). The end caps (24, 26) include annular snap elements 1210. In practice, the end caps (24, 26) are positioned over end portions (22, 22') and pressed into end portions (22, 22'). Annular snap elements 1210 engage the corresponding notches 1200 and end caps (24, 26) are fixedly attached to base plate 20. FIG. 12C is a detail plan view of notches 1200. FIG. 12D is a cross-sectional view showing annular snap member 1210 being inserted into notch 1200. The wall of the snap 1210 is secured by an interior wall 1204 formed in notch 1200.

Figure 13A:
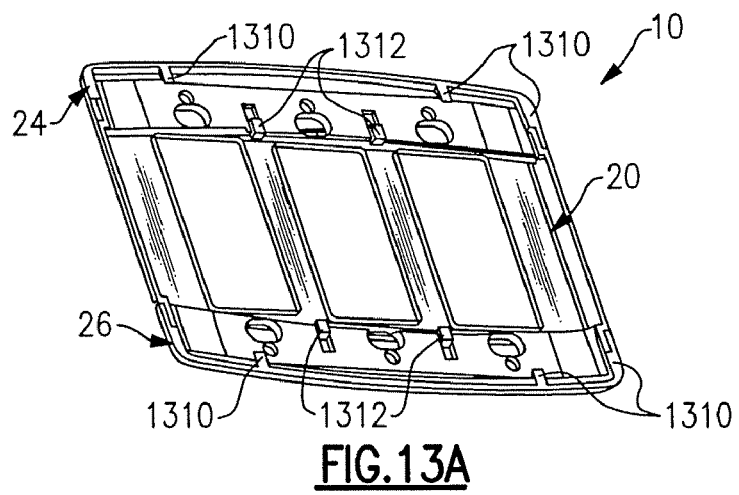
FIGS. 13A-13D show a base plate/cover cap connection system in accordance with yet another embodiment of the present invention.
Figure 13B:
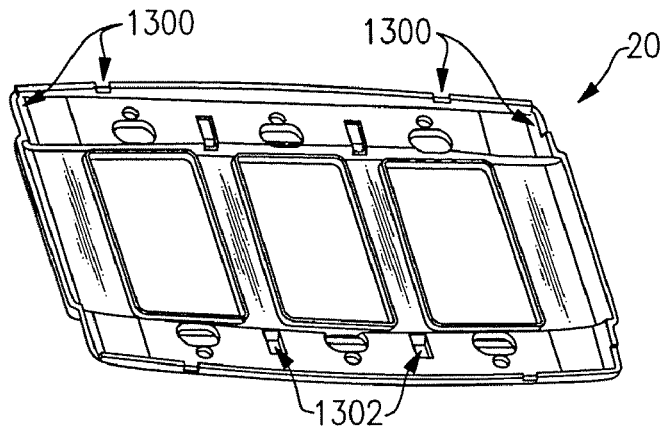
Figure 13C:
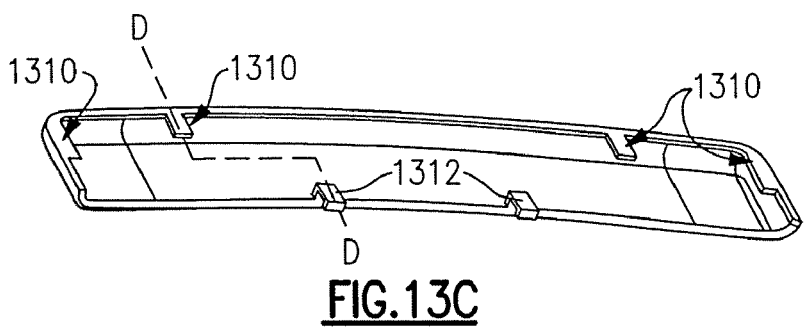
Figure 13D:
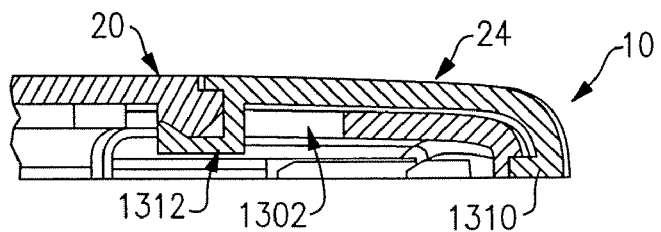

Referring to FIGS. 13A-13D, a base plate/cover cap connection system in accordance with yet another embodiment of the present invention is disclosed. In this embodiment, the end cover caps (24, 26) slide over the end portions (22, 22') of base plate member 20. FIG. 13A shows a rear view of a fully assembled system 10. End cap covers (24, 26) include hold down tabs 1310 and slide snaps 1312. FIG. 13B shows base member 20 which includes slots 1300 that accommodate hold down tabs 1310 and slots 1302 that accommodate slide snaps 1312. FIG. 13D is a cross-sectional view of assembly 10 and shows slide snap 1312 inserted into slot 1302.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A decorative wall plate assembly configured to cover at least one electrical device disposed in a wall box, the assembly comprising:

a base plate member characterized by a first perimetric edge, a second perimetric edge, a third perimetric edge parallel to the first perimetric edge, and a fourth perimetric edge parallel to the second perimetric edge, the base plate member comprising a center portion disposed between the first perimetric edge and the third perimetric edge, the center portion including at least one aperture configured to accommodate the at least one electrical device, a first end portion of the base plate member disposed adjacent the center portion and bounded by a portion of the first perimetric edge, the second perimetric edge, and a portion of the third perimetric edge, the first end portion including at least one first plate connection device, and a second end portion of the base plate member disposed adjacent the center portion and bounded by a portion of the first perimetric edge, the fourth perimetric edge, and a portion of the third perimetric edge, the second end portion including at least one second plate connection device, whereby the center portion is disposed between the first end portion and the second end portion;

a first cover cap including at least one first cover cap connection device configured to mate with the at least one first plate connection device, the first cover cap being configured to substantially cover the first end portion; and a second cover cap including at least one second cover cap connection device configured to mate with the at least one second plate connection device, the second cover cap being configured to substantially cover the second end portion.

2. The assembly of claim 1, wherein the first end portion includes a first screw hole disposed therein and the second end portion includes a second screw hole disposed therein, the first cover cap being configured to cover the first screw hole and the second cover cap being configured to cover the second screw hole.

3. The assembly of claim 1, wherein a first interface between the center portion and the first end portion is substantially linear, the first cover cap being configured to conform to the first interface.

4. The assembly of claim 1, wherein a first interface between the center portion and the first end portion is curvilinear, the first cover cap being configured to conform to the first interface.

5. The assembly of claim 1, wherein a second interface between the center portion and the second end portion is substantially linear, the second cover cap being configured to conform to the first interface.

6. The assembly of claim 1, wherein a second interface between the center portion and the second end portion is curvilinear, the second cover cap being configured to conform to the second interface.

7. The assembly of claim 1, wherein the decorative wall plate assembly is a multi-gang assembly configured to accommodate a plurality of electrical devices.

8. The assembly of claim 7, wherein the plurality of electrical devices are selected from a group of electrical devices that include an electrical switch, an electrical outlet, a dimmer switch, a thermostat, a sensor device, a cable television device, a telephony related device, a TVSS, and/or an electric circuit protection device.

9. The assembly of claim 1, wherein the at least one aperture is sized to accommodate the at least one electrical device.

10. The assembly of claim 1, further comprising a center cover including at least one center cover connection device configured to mate with at least one center portion connection device, the center cover being configured to substantially cover the center portion.

11. The assembly of claim 10, wherein the center cover is comprised of a material selected from a group of materials that includes a plastic material, polycarbonate, nylon, and/or metal materials.

12. The assembly of claim 11, wherein the center cover includes a finish layer comprised of a finish material that is selected from a group of finish materials that includes wood, clear plastic, stone, metal, polycarbonate, Corian and/or leather materials.

13. The assembly of claim 1, wherein the base plate member, first cover cap and second cover cap are comprised of a material selected from a group of materials that includes a plastic material, polycarbonate, nylon, and/or metal materials.

14. The assembly of claim 13, wherein the base plate member, first cover cap, and second cover cap are formed by at least one process selected from a group of processes that includes injection molding, casting, stamping, and/or milling.

15. The assembly of claim 1, wherein the first cover cap and the second cover cap include finish layers comprising at least one finish material that is selected from a group of finish materials that includes wood, stone, clear plastic, metal, polycarbonate, Corian and/or leather materials.

16. The assembly of claim 1, wherein at least a portion of the first cover cap is comprised of a clear plastic material, the first cover cap being configured to accommodate a first sheet of material disposed between the first cover cap and the first end portion.

17. The assembly of claim 16, wherein at least a portion of the second cover cap is comprised of a clear plastic material, the second cover cap being configured to accommodate a second sheet of material disposed between the second cover cap and the second end portion.

18. The assembly of claim 17, wherein the first sheet of material and/or the second sheet of material are selected to match a selected décor, at least one color, pattern, item, and/or furniture style.

19. The assembly of claim 1, wherein at least a portion of the first cover cap and/or the second cover cap is comprised of a material configured to emit light generated by a light source included in the electrical device to a region in vicinity of the electrical device.

20. The assembly of claim 1, wherein the first cover cap and/or the second cover cap is selectable from a plurality of cover caps configured to allow light generated by the light source to be selectively emitted to a region in vicinity of the electrical device.

21. The assembly of claim 1, wherein at least a portion of the first cover cap and/or the second cover cap is comprised of a material configured to conduct light in vicinity of the electrical device to a light detector included in the electrical device.

22. The assembly of claim 1, wherein the first cover cap or the second cover cap is selectable from a plurality of cover caps configured to allow light that is present in the vicinity of the electrical device to be selectively conducted to a light detector included in the electrical device.

23. The assembly of claim 1, wherein the wherein the first cover cap and/or the second cover cap include human readable indicia formed therein.

24. The assembly of claim 23, wherein the wherein the human readable indicia includes alphanumeric characters.

25. The assembly of claim 23, wherein the wherein the human readable indicia includes tactile data.

26. The assembly of claim 1, wherein the wherein the first cover cap and/or the second cover cap include a pattern formed therein.

27. The assembly of claim 1, wherein the decorative wall plate assembly is configured to accommodate a plurality of electrical devices.

28. The assembly of claim 1, wherein the at least one electrical device is selected from a group of electrical devices that include an electrical switch, an electrical outlet, a dimmer switch, a thermostat, a sensor device, a cable television device, a telephony related device, a TVSS, and/or an electric circuit protection device.

29. The assembly of claim 1, further comprising:
a first lateral cover cap including at least one first lateral cover cap connection device configured to mate with at least one first lateral plate connection device, the first lateral cover cap being configured to cover a first lateral portion of the base plate member; and
a second lateral cover cap including at least one second lateral cover cap connection device configured to mate with at least one second lateral plate connection device, the second lateral cover cap being configured to cover a second lateral portion of the base plate member.

30. The assembly of claim 1, wherein the at least one first cover cap connection device is configured to snap into the at least one first plate connection device and the at least one second cover cap connection device is configured to snap into the at least one second plate connection device.

31. The assembly of claim 1, wherein the at least one first cover cap connection device is configured to slide onto the first end portion and the at least one second cover cap connection device is configured slide onto the second end portion.

32. The assembly of claim 1, wherein the at least one first plate connection device and/or the at least one second plate connection device include at least one leveling connection device.

33. The assembly of claim 32, wherein the at least one leveling connection device include ratcheting elements.

34. The assembly of claim 1, wherein the at least one first cover cap connection device includes a plurality of first cover cap connection devices and the at least one first plate connection device includes a plurality of first plate connection devices corresponding to the plurality of first cover cap connection devices, and wherein the at least one second cover cap connection device includes a plurality of second cover cap connection devices and the at least one second plate connection device includes a plurality of second plate connection devices corresponding to the plurality of second cover cap connection devices.

35. The assembly of claim 1, wherein the first cover cap includes a first slot configured to accommodate a tool for separating the first cover cap from the base plate member.

36. The assembly of claim 35, wherein the base plate member further comprises a first tab member disposed in a location corresponding to the first slot when the first cover cap is attached to the base plate member, the first tab member also being configured to accommodate the tool for separating the first cover cap from the base plate member.

37. The assembly of claim 35, wherein the second cover cap includes a second slot configured to accommodate the tool for separating the second cover cap from the base plate member.

38. The assembly of claim 37, wherein the base plate member further comprises a second tab member disposed in a location corresponding to the second slot when the second cover cap is attached to the base plate member, the second tab member also being configured to accommodate the tool for separating the second cover cap from the base plate member.

39. A method for making a decorative wall plate assembly configured to cover at least one electrical device disposed in a wall box, the method comprising:
forming a base plate member having a first perimetric edge, a second perimetric edge, a third perimetric edge parallel to the first longitudinal perimetric edge, and a fourth perimetric edge parallel to the second perimetric edge, the base plate member comprising a center portion disposed between the first perimetric edge and the third longitudinal perimetric edge, the center portion including at least one aperture configured to accommodate the at least one electrical device, a first end portion of the base plate member disposed adjacent the center portion and bounded by a portion of the first perimetric edge, the second perimetric edge, and a portion of the third perimetric edge, the first end portion including at least one first plate connection device, and a second end portion of the base plate member disposed adjacent the center portion and bounded by a portion of the first perimetric edge, the fourth perimetric edge, and a portion of the third perimetric edge, the second end portion including at least one second plate connection device, whereby the center portion is disposed between the first end portion and the second end portion;
forming a first cover cap including at least one first cover cap connection device configured to mate with the at least one first plate connection device, the first cover cap being configured to substantially cover the entire first end portion;
forming a second cover cap including at least one second cover cap connection device configured to mate with the at least one second plate connection device, the second cover cap being configured to substantially cover the entire the second end portion.

40. The method of claim 39, further comprising the step of associating the base plate member, the first cover cap, and the second cover cap for subsequent installation.

41. A method for installing the decorative wall plate assembly of claim 39, the method comprising:
coupling the base plate member to the at least one electrical device;
attaching the first cover cap to the first end portion by mating the at least one first cover cap connection device to the at least one first plate connection device, whereby the first cover cap covers the first end portion; and
attaching the second cover cap to the second end portion by mating the at least one second cover cap connection device to the at least one second plate connection device, whereby the second cover cap covers the second end portion.

42. The method of claim 41, wherein the at least one first cover cap connection device is configured to snap into the at least one first plate connection device and the at least one second cover cap connection device is configured to snap into the at least one second plate connection device.

43. The method of claim 41, wherein the at least one first plate connection device and the at least one second plate connection device each include ratcheting elements such that the at least one first cover cap connection device is configured to ratchet into the at least one first plate connection device and the at least one second cover cap connection device is configured to ratchet into the at least one second plate connection device.

44. The method of claim 41, further comprising the step of selecting the base plate member, the first cover cap, and the second cover cap to match a selected décor, at least one color, pattern, item, and/or furniture style.

45. A decorative wall plate assembly configured to cover at least one electrical device disposed in a wall box, the assembly comprising:
a base plate member characterized by a first perimetric edge, a second perimetric edge, a third perimetric edge parallel to the first longitudinal perimetric edge, and a fourth perimetric edge parallel to the second perimetric edge, the base plate member comprising a center portion including at least one aperture configured to accommodate the at least one electrical device, a first end portion of the base plate member disposed adjacent the center portion and bounded by a portion of the first perimetric edge, the second perimetric edge, and a portion of the third perimetric edge, the first end portion including at least one first plate connection device, and a second end portion of the base plate member disposed adjacent the center portion and bounded by a portion of the first perimetric edge, the fourth perimetric edge, and a portion of the third perimetric edge, the second end portion including at least one second plate connection device, whereby the center portion is disposed between the first end portion and the second end portion and includes a center portion finished surface;
a first cover cap including at least one first cover cap connection device configured to mate with the at least one first plate connection device, the first cover cap being configured to substantially cover the entire first end portion and includes a first cover cap finished surface; and a second cover cap including at least one second cover cap connection device configured to mate with the at least one second plate connection device, the second cover cap being configured to substantially cover the entire second end portion and includes a second cover cap finished surface.

46. A method for redecorating a living space that includes at least one decorative wall plate assembly configured to cover at least one electrical device disposed in a wall box, comprising:

provi ding a base plate member having a first perimetric edge, a second perimetric edge, a third perimetric edge parallel to the first longitudinal perimetric edge, and a fourth perimetric edge parallel to the second perimetric edge, the base plate member comprising a center portion including at least one aperture configured to accommodate the at least one electrical device, a first end portion of the base plate member disposed adjacent the center portion and bounded by a portion of the first perimetric edge, the second perimetric edge, and a portion of the third perimetric edge, the first end portion including at least one first plate connection device, and a second end portion of the base plate member disposed adjacent the center portion and bounded by a portion of the first perimetric edge, the fourth perimetric edge, and a portion of the third perimetric edge, the second end portion including at least one second plate connection device, the center portion being disposed between the first end portion and the second end portion, the decorative wall plate assembly also including a first cover cap including at least one first cover cap connection device configured to mate with the at least one first plate connection device, the first cover cap substantially covering the entire first end portion, the decorative wall plate assembly further including a second cover cap including at least one second cover cap connection device configured to mate with the at least one second plate connection device, the second cover cap substantially covering the entire second end portion;

removing the first cover cap from the first end portion; and attaching a substitute first cover cap including at least one first cover cap connection device configured to mate with the at least one first plate connection device, the substitute first cover cap being configured to cover the first end portion.

47. The method of claim 46, further comprising:

removing the second cover cap from the second end portion; and attaching a substitute second cover cap including at least one second cover cap connection device configured to mate with the at least one second plate connection device, the substitute second cover cap being configured to cover the second end portion.

* * * * *